United States Patent [19]
Stall et al.

[11] Patent Number: 5,914,141
[45] Date of Patent: Jun. 22, 1999

[54] EASY PEELING WIENER CASINGS VIA USE OF ENZYMES

[75] Inventors: Alan David Stall, Naperville, Ill.; Albin F. Turbak, Sandy Springs, Ga.

[73] Assignee: Alfacel s.a., Madrid, Spain

[21] Appl. No.: 08/815,159

[22] Filed: Mar. 11, 1997

[51] Int. Cl.$^6$ ............................................. A23L 1/31
[52] U.S. Cl. .......................... 426/105; 426/55; 426/56; 426/57
[58] Field of Search ............................ 426/105, 55, 56, 426/57

[56] References Cited

U.S. PATENT DOCUMENTS

| | | | |
|---|---|---|---|
| 604,206 | 5/1898 | Cross et al. | |
| 1,036,282 | 8/1912 | Lilienfeld | |
| 1,070,776 | 8/1913 | Cohoe et al. | |
| 1,158,400 | 10/1915 | Cohoe | |
| 1,163,740 | 12/1915 | Cohoe | |
| 1,601,686 | 9/1926 | Henderson | |
| 1,612,508 | 12/1926 | Henderson et al. | |
| 1,645,050 | 10/1927 | Henderson | |
| 1,654,253 | 12/1927 | Henderson | |
| 2,001,461 | 5/1935 | Hewitt | 17/45 |
| 2,010,626 | 8/1935 | Dietrich | 17/45 |
| 2,181,329 | 11/1939 | Hewitt | 99/271 |
| 2,583,654 | 1/1952 | Korsgaard | 17/1 |
| 2,722,714 | 11/1955 | Blizzard et al. | 17/42 |
| 2,794,544 | 6/1957 | Firth | 206/46 |
| 2,983,949 | 5/1961 | Matecki | 17/42 |
| 2,984,574 | 5/1961 | Matecki | 99/176 |
| 2,999,756 | 9/1961 | Shiner et al. | 99/176 |
| 2,999,757 | 9/1961 | Shiner et al. | 99/176 |
| 3,028,952 | 4/1962 | Milio et al. | 206/46 |
| 3,097,393 | 7/1963 | Matecki | 17/45 |
| 3,110,058 | 11/1963 | Marbach | 17/42 |
| 3,158,896 | 12/1964 | Marbach | 17/45 |
| 3,222,192 | 12/1965 | Arnold et al. | 99/176 |
| 3,250,629 | 5/1966 | Turbak | 99/176 |
| 3,266,911 | 8/1966 | Clement | 99/176 |
| 3,397,069 | 8/1968 | Urbutis et al. | 99/176 |
| 3,451,827 | 6/1969 | Bridgeford | 99/176 |
| 3,454,982 | 7/1969 | Arnold | 17/42 |
| 3,456,286 | 7/1969 | Martinek | 17/49 |
| 3,462,794 | 8/1969 | Martinek | 17/42 |
| 3,594,856 | 7/1971 | Michl | 17/42 |
| 3,616,489 | 11/1971 | Voo et al. | 17/42 |
| 3,683,019 | 8/1972 | Wakamatsu et al. | 260/534 |
| 3,695,901 | 10/1972 | Winokur | 99/176 |
| 3,753,756 | 8/1973 | Lox et al. | 117/8 |
| 3,798,301 | 3/1974 | Rassbach et al. | 264/294 |
| 3,818,947 | 6/1974 | Rose | 138/118.1 |
| 3,834,920 | 9/1974 | Rose | 106/267 |
| 3,835,113 | 9/1974 | Burke et al. | 260/216 |
| 3,865,954 | 2/1975 | Tums et al. | 426/140 |
| 3,898,348 | 8/1975 | Chiu et al. | 426/413 |
| 3,909,882 | 10/1975 | Winokur | 17/42 |
| 3,944,470 | 3/1976 | Diehl et al. | 195/63 |
| 3,950,277 | 4/1976 | Stewart et al. | 252/541 |
| 3,965,537 | 6/1976 | Ross et al. | 17/42 |
| 3,981,046 | 9/1976 | Chiu | 17/49 |
| 4,011,169 | 3/1977 | Diehl et al. | 252/95 |
| 4,062,980 | 12/1977 | Wilson et al. | 426/278 |
| 4,062,981 | 12/1977 | Bridgeford | 426/278 |
| 4,137,947 | 2/1979 | Bridgeford | 138/118.1 |
| 4,248,900 | 2/1981 | Hammer et al. | 426/105 |
| 4,275,081 | 6/1981 | Coleman et al. | 426/33 |
| 4,374,871 | 2/1983 | Steinbis | 427/236 |
| 4,388,331 | 6/1983 | Miller | 426/63 |
| 4,393,085 | 7/1983 | Spradlin et al. | 426/28 |
| 4,489,114 | 12/1984 | Bridgeford | 428/36 |
| 4,528,225 | 7/1985 | Hutschenreuter et al. | 428/36 |
| 4,540,569 | 9/1985 | Ohnishi et al. | 424/94 |
| 4,543,282 | 9/1985 | Hammer et al. | 428/36 |
| 4,563,376 | 1/1986 | Hammer et al. | 428/36 |
| 4,590,107 | 5/1986 | Bridgeford | 428/36 |
| 4,596,727 | 6/1986 | Higgins et al. | 428/36 |
| 4,743,550 | 5/1988 | Ananthapadmanabhan et al. | 435/220 |
| 4,770,706 | 9/1988 | Pietsch | 106/24 |
| 4,778,639 | 10/1988 | Jon et al. | 264/190 |
| 4,818,551 | 4/1989 | Stall et al. | 426/420 |
| 4,844,129 | 7/1989 | Bridgeford et al. | 138/118.1 |
| 5,230,933 | 7/1993 | Apfeld et al. | 428/34.8 |
| 5,277,857 | 1/1994 | Nicholson et al. | 264/187 |
| 5,358,765 | 10/1994 | Markulin | 428/34.8 |
| 5,451,364 | 9/1995 | Ducharme, Jr. et al. | 264/559 |
| 5,719,048 | 2/1998 | Nilsson et al. | 396/93 |
| 5,782,683 | 7/1998 | Stall | 452/27 |

FOREIGN PATENT DOCUMENTS

| | | | |
|---|---|---|---|
| 0 041 149 | 5/1981 | European Pat. Off. | A22C 13/02 |
| 30 20 764 | 12/1981 | Germany | A22C 13/02 |
| 163227/1982 | 3/1984 | Japan | A22C 13/00 |

*Primary Examiner*—Chhaya D. Sayala
*Attorney, Agent, or Firm*—Marshall, O'Toole, Gerstein, Murray & Borun

[57] ABSTRACT

A method of shirring cellulosic skinless sausage casing comprises applying shirring solution comprising a member selected from the group of proteases and lipases in an amount effective to degrade the stuffed sausage contents adjacent the casing prior to peeling of the casing.

11 Claims, No Drawings

EASY PEELING WIENER CASINGS VIA USE OF ENZYMES

BACKGROUND OF THE INVENTION

This invention relates to an improved method of moisturizing shirred cellulose casing, normally referred to as skinless sausage casing.

Tubular cellulosic casing is well-known, and has been widely used for many years by numerous manufacturers. The basic process for manufacturing regenerated cellulosic casings is through the well-known viscose process, which creates a liquified colloidal dispersion of cellulose fibers in an alkaline liquid carrier. Viscose is described in English Patent 8700 to Cross, Bevan and Beadle. Patents such as U.S. Pat. No. 1,036,282 to Lilienfield refine the compositions. U.S. Pat. No. 1,070,776; U.S. Pat. No. 1,158,400; U.S. Pat. No. 1,163,740 to Cohoe and Fox describe use of viscose to manufacture a tubular cellulosic casing. Henderson, U.S. Pat. No. 1,601,686; U.S. Pat. No. 1,612,508; U.S. Pat. No. 1,645,050; U.S. Pat. No. 1,654,253 provide basic technology to manufacture viscose into tubular casings with regenerating baths touching the inner and outer surfaces of the tube.

Specific details for manufacture of modern day casings from viscose into regenerated cellulose are shown in U.S. Pat. Nos. 2,999,756 and 2,999,757 to Shiner; U.S. Pat. No. 3,835,113 to Burke, U.S. Pat. No. 4,590,107 to Bridgeford; U.S. Pat. No. 4,778,639 to Jon; and U.S. Pat. No. 5,358,765 to Markulin. These references describe extruding viscose (sodium cellulose xanthate, sodium hydroxide, water) through an annular die into a coagulating and regenerating bath to produce a regenerated cellulosic tubular casing. An alternative method for forming cellulosic casings known as the solvent spinning process using N-Methylmorpholine N-oxide solutions of cellulose is described in U.S. Pat. No. 5,277,857 and U.S. Pat. No. 5,451,364.

Artificial sausage casings are shirred according to conventional methods wherein long tubular lengths, often called "strands," are compacted to provide shorter, coherent tubes, often called "shirred sticks" or "sticks." The coherency of the stick is important in order that it remain straight and rigid. This is difficult to achieve, considering the shirring operation includes moisturizing and oil addition. Conventional shirring methods are illustrated by patents such as U.S. Pat. No. 2,001,461; U.S. Pat. No. 2,010,626; U.S. Pat. No. 2,583,654; U.S. Pat. No. 2,722,714; U.S. Pat. No. 2,983,949; U.S. Pat. No. 2,984,574; U.S. Pat. No. 3,097,393; U.S. Pat. No. 3,110,058; U.S. Pat. No. 3,397,069; U.S. Pat. No. 3,454,982; and U.S. Pat. No. 3,898,348. Chiu, U.S. Pat. No. 3,898,348 describes a coherency test of applying a beam bending moment to the shirred stick, with 1.0 inch-lbs bending moment being the minimum acceptable standard, and 2.5 inch-lbs being desired. Accordingly, it is well known in the art that coherency of the shirred stick is essential for utility.

Small diameter shirred food casings must be packaged for distribution and sale, and this packaging is critical to the performance of the commercial product because the casing has a thickness of 20 to 40 microns and can be easily damaged. Accordingly, the shirred sticks must be rigidly supported to prevent dimension deformation, survive the rigors of transportation, and yet be easily dispensed without much waste packaging at the final use. The shirred casing product is then filled with meat paste using high speed filling machines. The stuffing operation will handle sticks typically from 265 mm length to 546 mm length, containing casing typically ranging from 16.5 meters up to and in excess of 69 meters. Thus, one shirred stick could provide in excess of 500 frankfurters. Any defects in the stick are therefore costly to the meat processor.

As one aspect of the shirring process, it is known that administration of a shirring solution to the casing interior provides various advantages during shirring and thereafter during removal of the casing from the cooked sausage by peeling. Administration of the internal shirring solution moisturizes the casing, allowing it to achieve final humidity and to avoid breakage and further allows for the addition of peeling and release agents to the interior of the casing. Moreover, the casing shrinks slightly (about 1% to 3%) upon being wetted by solution with this shrinkage greatly reinforcing the internested cones formed during shirring and providing improved coherency to the shirred sticks.

One preferred material for shirring of cellulose food casings is white food grade mineral oil. U.S. Pat. No. 2,983,949 to Matecki outlines the use of White U.S. Mineral Oil of Saybolt viscosity 76° to 80° in the internal inflation air stream of the shirring machine. Other lubricants including cotton seed oil, soya oil, glycerine are also known for coating the inside surface of the casings. Oil is generally applied internally at a rate of from 5 to 25 mg per 100 square inches. Lubricating oil is also shown by Matecki to be applied to the external casing, both to lubricate the shirring rolls to prevent heat build up and to lubricate the casing to prevent damage during shirring and later stuffing with meat emulsion. In U.S. Pat. No. 3,097,393, Matecki specifies the use of White Mineral Oil, Saybolt viscosity 76° to 80° for external coating of casings with coverage onto the casing of between 0.002 grams to 0.013 grams per 6 inch casing length. Oil is thus generally applied externally at a rate of from about 20 to about 100 mg per 100 square inches.

Marbach, U.S. Pat. No. 3,110,058 shows a typical system for spraying internal liquids. Marbach also shows in U.S. Pat. No. 3,158,896 a means of using a commercial force-fed lubricator to apply this mineral oil. Arnold, U.S. Pat. No. 3,222,192 shows using water as the external lubricant for the shirring rolls, as well as for a means of increasing shirred stick moisture to the desired ratio of 17% to 18% by total weight of all components. Arnold also describes adding the moisture internally to the stick inside wall during shirring as an alternate method and adding surface active agents to increase wettability. Prior to this, casings were humidified externally in the packaged state as shown by Patents U.S. Pat. No. 2,181,329; U.S. Pat. No. 2,794,544; U.S. Pat. No. 3,028,952 and U.S. Pat. No. 3,250,629.

Clement in U.S. Pat. No. 3,266,911 shows the external oiling system describing mineral oil as the external lubricant. Bridgeford shows in U.S. Pat. No. 3,451,827 a mandrel designed to internally spray coatings onto the casing inner walls during shirring using compressed air as the propellant and exhausting the excess air. Bridgeford also discloses the use of external lubricating oil. Suitable lubricating oils include but are not limited to mineral oil, vegetable oils and glycerols with various additives including lecithin and carboxymethylcellulose.

Martinek in U.S. Pat. No. 3,456,286 teaches a means for using Bridgeford's technology to tightly compact casing. Martinek, U.S. Pat. No. 3,462,794 also discloses a fluid applicator to apply external shirr moisture to the casing, coincident with internal addition. Michl in U.S. Pat. No. 3,594,856 also added external moisturizing to the casing, post-shirring. Voo, U.S. Pat. No. 3,616,489 discloses a system to spray the shirred stick internal bore after shirring.

Rose, U.S. Pat. Nos. 3,818,947 and 3,834,920 discloses using a mineral oil coating inside (N.F. No. 9) along with a surfactant Myvacet 9-45 (acetylated glycerol monooleate) to more uniformly coat the mineral oil.

Chiu, U.S. Pat. No. 3,898,348 shows that the shirring solution can serve as a peeling agent, moisturizing agent and shirrability enhancer. Chiu teaches the use of shirring solutions comprising mixtures of water soluble cellulose ethers such as carboxy-methyl cellulose (CMC), mineral oil, surfactants (preferably polysorbate surfactants available as Tween® (ICI Chemicals)), and water, with polyols such as glycerine, sorbitol, propylene glycol and triethylene glycol being used as humectants to retard the penetration of the spray into the casing. Shirr solutions were taught to preferably be applied at 25° C. temperature (i.e., ambient room temperature) and were said to be characterized by viscosities of 500 cps with a maximum of 1500 cps. It is theorized that if the shirring solution penetrates slowly, the casing does not experience shrinkage while it is on the shirring machine. As a result, the tendency of the casings to seize the mandrel is reduced and the products can be manually transferred and manipulated on the shirring machine. Chin shows that reducing the humectant (i.e. propylene glycol) in the shirr solution allows faster water penetration increasing the rate of casing shrinkage and thus affecting the ability to slide the casing on the mandrel. However, if too much humectant is used, dimensional change can occur for several days after shirring in a relatively uncontrolled state resulting in excessive and undesirable dimensional change. Chiu, U.S. Pat. No. 3,981,046 further taught the use of propylene glycol as a humectant where the moisture of the final casing was produced in excess of 17% by using a humectant during shirring to reduce the rate of water imbibition by the casing.

Developments in the art since Chiu have resulted in a reduction of the quantity of propylene glycol added during shirring. While a 60% propylene glycol concentration in the shirr spray was typical at the time of Chiu, propylene glycol concentrations have more recently dropped to about 10% while other methodologies have been introduced to allow the sticks to be transferred easily without the retardation of water. It is known in the art that when levels of propylene glycol are reduced, it becomes more difficult to remove the shirred stick from the mandrel after compression due to the shrinkage exerted by the stick onto the mandrel. The casing can be damaged and the mandrel itself can bend and be damaged. Forces of several hundred pounds are not uncommon for stripping the shirred stick. Accordingly, it is now common to use very smooth surfaces such as those coated with Teflon® non-stick coatings to allow easier removal typically as disclosed in U.S. Pat. No. 3,097,393. Nevertheless, smooth coatings are difficult to use and still cause flattening of pleats and result in the radial reduction of the bore of the shirred stick. It is also known to taper the mandrel diameter towards the end of travel to alleviate the pressure. This can result in a smaller than desired stick bore (inner diameter) and often causes non-uniformity of stick inner and outer diameters.

Much effort in the art has been addressed toward alternative methods for improving the coherency of shirred casings. Winokur, U.S. Pat. Nos. 3,695,901 and 3,909,882 disclose methods for providing higher coherency by indenting the stick outer diameter with grooves. Rasbach, U.S. Pat. No. 3,798,301 discloses passing the shirred stick through a heated annular orifice to increase stick coherency.

Wilson, U.S. Pat. No. 4,062,980 discloses using sorbitan trioleate and glycerol monooleate as surfactants of the humidification fluid. Bridgeford in U.S. Pat. Nos. 4,062,981 and U.S. Pat. No. 4,137,947 describe use of sorbitan trioleate as a lubricating surfactant for the shirring spray, providing wettability and anti-jamming properties, yet achieving 14% to 20% shirred stick moisture. The method also reduces post-doffing stick expansion.

Hammer, U.S. Pat. No. 4,248,900 describes applying the release agents prior to shirring, winding the casing up, and then later shirring. Bridgeford in U.S. Pat. No. 4,489,114 combines arabinogalactans with cellulose ether to improve peelability by improving resistance to gluing of the pleats due to the cellulose ethers on the interior side. Hutschenreuter in U.S. Pat. No. 4,528,225 describes peeling systems of oils, cellulose ethers and chemical starches.

Hammer, U.S. Pat. No. 4,543,282 describes application of the shirring spray at ambient temperature, that is between 15° C. and 30° C., using various combinations of waxes, silicone oils and cellulose ethers. Alternate mixtures by Hammer are shown in U.S. Pat. No. 4,563,376. Higgins in U.S. Pat. No. 4,596,727 provides shirring solutions using Mazol 80 MG as a surfactant but maintaining propylene glycol at 22.5% to 49.00% in solution with final shirred stick moisture contents of 17% to 19.3%.

Stall in U.S. Pat. No. 4,818,551 recognized the dimensional change of shirred sticks and provided for this by maintaining the shirred casing on a dowel for 72 hours after shirring to allow full penetration of the shirr spray without loss of dimensional integrity of the shirred stick.

Bridgeford in U. S. Pat. No. 4,844,129 uses polydextrose additives for prevention of pleat lock. Apfeld in U.S. Pat. No. 5,230,933 uses a water soluble cellulose ether, dextrin, as a coherency enhancer and, optionally, lecithin as a peeling acid, optionally with a surfactant. Lecithin has been used by others, such as Japanese Patent 1632287/1982 to Suguro and Spanish Patent 549,161/4 to Michelena.

Of interest to the present invention is the disclosure of co-owned and copending U.S. application Ser. No. 08/703,796 filed Aug. 27, 1996 relating to methods and compositions for carrying out cold temperature shirring methods, the disclosure of which is hereby incorporated by reference.

In the manufacture of sausage such as hot dogs via the emulsion process, the meat emulsion has a pronounced tendency to adhere to the cellulosic casings, making it difficult to achieve rapid removal of the casings from the final finished meat product. Peeling of casings is typically carried out by automatic mechanical peelers. Nevertheless, in order to assist such peeling processes a steam shower may be used to loosen the casing from the sausage product. While the methods described previously improve the peelability of the skin by use of various shirring coatings including oils and carboxymethyl cellulose solutions, there nevertheless remains a desire in the art for means by which the peelability of sausage casings may be improved.

SUMMARY OF THE INVENTION

The invention provides an improved method of shirring cellulosic skinless sausage casing comprising applying a shirring solution to the interior of the casing interior wherein the shirring solution comprises a member selected from the group of proteases and lipases in an amount effective to degrade the stuffed sausage contents adjacent the casing prior to peeling of the cellulosic casing. According to this method, the proteins and fats at the surface of the meat emulsion adjacent the casing are gelatinized in the case of proteins or converted to lower molecular weight oils in the case of fats so as to form a slick surface layer. This surface layer then functions to greatly enhance the removal of the cellulose casing artificial skin from the finished meat product during the use of high speed casing removal equipment.

According to a preferred aspect of the present invention, the sausage casings of the improvised by cohirred at reduced temperatures as provided by co-owned and copending U.S. application Ser. No. 08/703,796 filed Aug. 27, 1996 relating to methods and compositions for carrying out cold temperature shirring methods, the disclosure of which is hereby incorporated by reference. In this manner, protease and/or lipase enzymes may be incorporated into shirring solutions such that they are not prematurely activated by exposure to the elevated temperatures to which such shirring solutions are typically exposed.

According to the invention, conventional shirring solutions may be used which comprise a member selected from the group of proteases and lipases in an amount effective to degrade the stuffed sausage contents prior to peeling of the cellulosic casing. Effective amounts are generally those that can carry out an effective degradation reaction in approximately one hour during cooking and/or smoking of the meat, which amounts may readily be determined by those of ordinary skill in the art. Typical concentrations of proteases and lipases in the shirring solutions of the invention range from about 0.1% to about 1.0% by weight with concentrations of about 0.5% by weight being particularly preferred. Such concentrations can provide coverage on the casings of about 0.3 mg/100 cm$^2$. Incorporation into the shirring solutions of amounts of enzymes which are too low will result in insufficient degradation of protein and/or lipids within the meat emulsion so as to not aid in peeling. Conversely, incorporation of too high an enzyme level or activation of the enzyme over too extended a period of time may result in a product having an excessively greasy surface.

According to one preferred method, the shirring solution comprises a protease and a lipase. According to a further preferred method, the shirring solution is applied to the interior of the casing at a temperature of less than 10° C. The invention further provides improved shirring solutions comprising lipase and/or protease enzymes in amounts effective to degrade portions of the stuffed sausage contents prior to peeling of the cellulosic casings and casings shirred with the improved shirring solutions.

DETAILED DESCRIPTION OF THE INVENTION

The present invention provides use of protease and/or lipase food grade enzymes as shirring fluid additives for cellulose casings prepared either by the viscose process or by the N-Methylmorpholine-N-oxide process. These enzymes act subsequent to shirring and stuffing of the casings to convert the surface proteins and fats of the encased meat emulsion during cooking and processing. The proteins so degraded convert to slick gelatinous products while the fats so degraded convert to slick oils. Either or both of these degraded species then serve as in situ formed slick surface coatings that allow the cooked sausage products to be rapidly peeled.

Specifically, the methods of the invention utilize protease and/or lipase enzymes which are capable of degrading protein and lipids respectively. Thus, the protease enzymes utilized according to the invention are organic molecules capable of degrading proteins to a lower molecular weight and to form gelatinous molecules which form slick surfaces. Similarly, lipase enzymes are organic molecules which are capable of converting high molecular weight fats into lower molecular weight oils characterized by reduced viscosity.

Thus, the meat emulsions used for making sausage products contain meat protein and fats intimately mixed as emulsion size particles. The lipase and protease enzymes used according to the invention have the effect of degrading the lipid and protein components to which they come into contact. The enzyme catalyzed degradation reactions are accelerated at elevated temperatures such as take place during cooking and smoking processes. Ideal conditions for activation of the enzymes occur during smokehouse curing at which point meat temperatures exceed 165° F. for a period of 1.5 to 2 hours. Otherwise, the casings can be stored for long periods of time in a cool damp environment to prevent inactivation of the enzyme.

Because enzymes are quite specific in their activity, it is preferred that only protease and lipase enzymes be used according to the invention. Cellulose enzymes will degrade cellulose and will be detrimental to cellulosic casings rendering them weak and useless. Further, preferred enzymes for use according to the methods of the invention are those which function in a temperature range of about 160 to 210° F. such as occurs during cooking of meat and at a pH range of about 4.0 to 7.0. Thus, it is necessary to choose those enzymes which will do the proper job of changing the proteins and fats in the meat emulsion during the temperatures of the meat cooking cycles and at the acidity of the meat emulsions. Such enzymes exist and are approved for use in food products. Preferred food grade enzymes include those available commercially from Novo Nordisk Biochem Co. (Franklinton, N.C.) as Novozym 388; Novozym 877 and Alcalse 0.6L which is a protease the main enzyme component of which is Subtilisin A.

Preferred enzymes are those which are stable in the presence of water and of food grade glycols and polyols such as propylene glycol, glycerol, and the like and can be applied during regular shirring operations which utilize such glycols and polyols as part of their shirring lubricity fluid. The preferred enzymes are also stable in the presence of both mineral and vegetable oils which may be used in the shirring coating compositions and should be stable under the conditions of acidity necessary to guarantee the integrity of the cellulose casings during storage, i.e. pH of 5.5–9.0.

When these or similar enzymes are used at concentration of at least 0.05% on the weight of the bone dry casing, then the surface of the wieners is readily converted to a slick gelatinous and oily surface during cooking of the meat emulsion and the sausages readily pop out of the casing during peeling.

The casings to which the enzyme containing shirring solution have been applied are stable during storage for over one year and become active only when they are heated during the meat cooking cycle. Enzyme activity is greatest between 120° F. and 160° F. The meat is typically within this temperature range for about one hour during the process of cooking. As the meat reaches higher temperatures during cooking, the enzymes tend to become deactivated.

Preferred components of shirr solutions for the promotion of peeling include cellulose ethers, with carboxymethyl celluloses (CMCs) being preferred and the CMC available as CMC-7LF from Hercules Incorporated (now renamed Aquilon Division) being particularly preferred. Such peeling agents help create a gelatinous coating between the meat paste and the casing, preventing adherence of the meat fibers to the casing wall. As one aspect of the invention, it is contemplated that the amounts of CMC typically incorporated into the shirring solutions may be reduced by adoption of the methods of the invention.

In is well known in the art that certain meat processing conditions require the addition of an extra additive into the shirring solution to aid peeling. One useful additive is a lecithin compound, with Lecithin Centrophil®W, Centrophase®NV and other Centrophil series lecithins available commercially from Central Soya being particularly preferred. These lecithins are liquid at room temperature with a low viscosity (150 cps), ideal for mixing. Other suitable lecithins include Beakin LV1 and Beakin LV3 available from ADM Ross & Rowe. While the viscosity of lecithin is highly sensitive to temperature (for example, the viscosity of Centrophil W doubling to 300 cps when reduced from room temperature to 40° F.), those of skill in the art provided with the teachings herein would be capable of selecting appropriate lecithins and other components for low temperature shirring.

Lecithin also functions as an emulsifier and surfactant in shirring solutions and is used to help wet the spray onto the casing and to help keep surface tensions sufficiently low that the carboxymethylcellulose cannot bind together as a glue on inner pleat surfaces. Additional lubricating surfactants such as sorbitan trioleate available as Span-850® (ICI Americas, Inc.) are also desirable as components of the mixture. Span-85™ has an HLB of 1.8 and is particularly preferred as a lubricating surfactant. Other surfactants are available to those of skill in the art including Arlacel 186™, Arlatone 985™, Arlatone T™, Brij 93™ and Tween 81™ which have low HLBs and are suitable for use as "oily" lubricants in shirring solutions. Polyols can also be incorporated into the shirring solution in accordance with the methods of the art. The polyol concentration of shirring solutions used according to the invention can typically range from about 20 to 40%, although when the cold shirring methods are practiced, polyol concentrations can be reduced to as low as 5 to 15% and possibly eliminated.

EXAMPLE 1

Cellulose casings prepared via the viscose process are shirred, under either conventional or cold shirring conditions, with a composition containing propylene glycol, water, mineral oil and 0.5% food grade protease enzyme as set out in the table below.

|  | Percent in Solution | Coverage on Casing, mg/100 cm$^2$ |
|---|---|---|
| Water | 70.0 | 37.8 |
| Cellulose ether (CMC-7LF) | 1.0 | 0.54 |
| Propylene Glycol or Glycerine | 23.5 | 12.69 |
| Sorbitan trioleate (Span 85 ®) | 1.0 | 0.54 |
| Mineral Oil (Britol 6NF), inside | 4.0 | 2.16 |
| Enzyme | 0.5 | 0.27 |

The shirred casings are stuffed according to conventional methods on a Frank-A-Matic stuffer and processed in the usual manner reaching internal sausage product temperatures reaching at least 155° F. for 15 minutes. The cooking temperature results in activation of the protease enzyme which acts to gelatinize the protein component of the sausage product which is in proximity to the casing. The products are then directly put onto a Ranger Peeler and are expected to peel well with no misses or problems.

EXAMPLE 2

Cellulose casings are prepared via the solvent spinning process using N-Methylmorpholine N-oxide solutions of cellulose as described in U.S. Pat. No. 5,277,857 and U.S. Pat. No. 5,451,364. These casings are shirred using standard mixtures of propylene glycol, water and mineral oil to which was added 0.5% of a food grade protease enzyme according to the formulation set out below. The casings are stuffed on a Frank-A-Matic stuffer and cooked according to the methods of Example 1. The wieners are then peeled directly on a Ranger type peeler and are expected to peel readily with no misses or adhesion problems.

EXAMPLE 3

According to this example, cellulose casings prepared via the viscose process are shirred with a composition containing propylene glycol, water, mineral oil and 0.2% food grade lipase enzyme according to the table below.

|  | Percent in Solution | Coverage on Casing, mg/100 cm$^2$ |
|---|---|---|
| Water | 70.0 | 37.8 |
| Cellulose ether (CMC-7LF) | 1.0 | 0.54 |
| Propylene Glycol or Glycerine | 23.8 | 12.85 |
| Sorbitan trioleate (Span 85 ®) | 1.0 | 0.54 |
| Mineral Oil (Britol 6NF), inside | 4.0 | 2.16 |
| Enzyme | 0.2 | 0.11 |

The shirred casings are stuffed according to the method of Example 1 on a Frank-A-Matic stuffer and processed in the usual manner reaching internal sausage product temperatures reaching at least 155° F. for 15 minutes. The cooking temperature results in activation of the lipase enzyme which acts to degrade the fat content of the sausage product which is in proximity to the casing to produce lower viscosity oils. The products are then directly put onto a Ranger Peeler according to the methods of Example 1 and are expected to peel well with no misses or problems as a consequence of the oil produced in the vicinity of the casing.

EXAMPLE 4

According to this example, cellulose casings prepared via the solvent spinning process are shirred with a composition containing propylene glycol, water, mineral oil and 0.2% food grade lipase enzyme according to the general formula of Example 3 above. The shirred casings are stuffed according to the method of Example 1 on a Frank-A-Matic stuffer and processed in the usual manner reaching internal sausage product temperatures reaching at least 155° F. for 15 minutes. The cooking temperature results in activation of the lipase enzyme which acts to degrade the fat content of the sausage product which is in proximity to the casing to produce lower viscosity oils. The products are then directly put onto a Ranger Peeler according to the methods of Example 1 and peel well with no misses or problems as a consequence of the oil produced in the vicinity of the casing.

EXAMPLE 5

According to this example, the method of Example 1 is repeated using a shirring solution comprising mixture of 0.5% protease enzyme and 0.1% lipase enzyme. The products so processed are peeled in a Ranger Peeler and the products are expected to have an excellent peeling performance. In this case, an improvement in the fatting out in the product surface is expected as compared to that of Example 1, i.e., fat in the meat emulsion is retarded from coating the wiener because it is consumed by the enzyme.

EXAMPLE 6

According to this example, the method of Example 2 is repeated using a shirring solution comprising a mixture of 0.5% protease enzyme and 0.1% lipase enzyme. The products so processed are peeled in a Ranger Peeler and the products are expected to have an excellent peeling performance. In this case, an improvement in the fatting out in the product surface is expected as compared to that of example 1, i.e., fat in the meat emulsion is retarded from coating the wiener because it is consumed by the enzyme.

Numerous modifications and variations in the practice of the invention are expected to occur to those skilled in the art upon consideration of the presently preferred embodiments thereof. Consequently, the only limitations which should be placed upon the scope of the invention are those which appear in the appended claims.

What is claimed is:

1. In a method of shirring cellulosic skinless sausage casing comprising applying a shirring solution to the interior of the casing interior the improvement comprising, applying shirring solution comprising a member selected from the group consisting of proteases and lipases in an amount effective to degrade the stuffed sausage contents adjacent the casing prior to peeling of the casing.

2. The method of claim 1 wherein the shirring solution comprises a protease.

3. The method of claim 1 wherein the shirring solution comprises a lipase.

4. The method of claim 1 wherein the shirring solution comprises a protease and a lipase.

5. The method of claim 1 wherein the shirring solution is applied to the interior of the casing at a temperature of less than 10° C.

6. The method of claim 1 wherein the shirring solution comprises from 0.1% to 1.0% protease.

7. The method of claim 1 wherein the shirring solution comprises from 0.1% to 1.0% lipase.

8. A cellulosic skinless sausage casing shirred on its interior with a shirring solution comprising a member selected from the group consisting of proteases and lipases in an amount effective to degrade the stuffed sausage contents adjacent the casing prior to peeling of the casing.

9. The shirred casing of claim 8 wherein the shirring solution comprises a protease.

10. The shirred casing of claim 8 wherein the shirring solution comprises a lipase.

11. The shirred casing of claim 8 wherein the shirring solution comprises a protease and a lipase.

* * * * *